United States Patent [19]

Invernizzi et al.

[11] 4,194,011
[45] Mar. 18, 1980

[54] MANUFACTURE OF CHEESE

[75] Inventors: Rutilio Invernizzi, Milan; Giovanni Prella, Vercelli, both of Italy

[73] Assignee: Societe d'Assistance Technique pour Produits Nestle S.A., Lausanne, Switzerland

[21] Appl. No.: 820,299

[22] Filed: Jul. 29, 1977

[30] Foreign Application Priority Data

Aug. 2, 1976 [IT] Italy .................. 50724 A/76
Feb. 3, 1977 [IT] Italy .................. 47896 A/77

[51] Int. Cl.² .................. A23C 19/02; A23C 19/14
[52] U.S. Cl. .................. 426/8; 426/36; 426/38; 426/40; 426/399; 426/491; 426/572
[58] Field of Search .................. 426/36, 43, 40, 582, 426/8, 34, 522, 491, 399

[56] References Cited

U.S. PATENT DOCUMENTS

| | | | |
|---|---|---|---|
| 3,929,892 | 12/1975 | Hynes et al. | 426/36 X |
| 4,018,752 | 4/1977 | Buhler et al. | 426/36 |
| 4,022,914 | 5/1977 | Moody | 426/34 X |
| 4,058,630 | 11/1977 | Busnel | 426/36 |

OTHER PUBLICATIONS

Kosikowski, F. V., Cheesemaking by Ultrafiltration, Journal of Dairy Science, vol. 57, No. 4, 1974, (pp. 488-491).

*Primary Examiner*—David M. Naff
*Attorney, Agent, or Firm*—Watson, Leavenworth, Kelton & Taggart

[57] ABSTRACT

A process for the production of cheese which comprises preparing a starting material, the composition of which is that of the cheese which it is desired to produce, subjecting this material to a thermal pasteurization or sterilization treatment, packaging the pasteurized or sterilized material under heat in a hermetic container or containers while at the same time adding a fermentation agent to it and, finally, incubating the product thus packaged until fermentation is complete.

24 Claims, No Drawings

MANUFACTURE OF CHEESE

This invention relates to a process for the production of cheeses.

It is traditional in the cheese making industry to distinguish between several types of cheeses in dependence inter alia upon their appearance and upon their characters as finished cheeses. One of these types includes the so-called "fresh cheeses" which derive their name from the fact that, to a greater or lesser extent, they resemble freshly drained dairy curds and from the fact that they have not undergone any ripening.

Certain fresh cheeses, such as Ricotta and Mascapone, are obtained after the thermal coagulation of milk. Other, more numerous fresh cheeses are obtained after the coagulation of milk by means of lactic ferments which, by transforming the lactose into lactic acid, increase the acidity of the mild up to the isoelectric pH of casein. This is the case for example with Petit Suisse, Quark and, by causing coagulation, generally with so-called "lactic" pastes. Finally, other fresh cheeses, particularly Mozzarella, are obtained by the coagulation of milk with rennet, followed by ripening of the curd by lactic fermentation and extrusion of the drained mass.

Due in particular to their high water content and to the absence of crusts, fresh cheeses are excellent fermentable media which are exposed to all kinds of contamination, which explains the fact that they cannot normally be kept for more than a few days. If it is intended to preserve their fresh-cheese character for as long as possible, it is advisable to prevent any alternation in one way or another, for example by drying, by cold storage or by thermal inactivation of the microorganisms.

It will readily be appreciated that drying is only applicable to products of which the texture is of no importance (for example cheeses of the grated or powdered type, cheeses for garnishing foods). Cold storage, normally at around 4° C., obviously necessitates a cold-storage chain for the distribution of the products. On the whole, the effect of cold storage on certain agents capable of causing deterioration, such as yeasts and molds, is very limited and is inadequate for long-term conservation. Stabilisation by the thermal inactivation of microorganisms (pasteurisation, sterilisation), which is applied above all in the field of processed cheeses, is occasionally used for lactic pastes, such as cream cheese for example. However, the products thus obtained are so-called "dead" products (they no longer contain any living ferments) of which the aroma is significantly weakened and of which the texture is also more or less remote from the texture of fresh original cheeses.

The present invention obviates many of the disadvantages referred to above in that, for example, it allows the production of "living" cheeses which keep for long periods. The present invention provides a process for the production of cheese which comprises preparing a starting material the composition of which is that of the cheese which it is desired to produce, subjecting this material to a thermal pasteurisation or sterilisation treatment, packaging the pasteurised or sterilised material under heat in a hermetic container or containers whilst at the same time adding a fermentation agent to it and, finally, incubating the product thus packaged until fermentation is complete.

As mentioned above, it is possible by this process to produce fresh cheeses which keep for long periods although they are living products in the manner of traditional short-lived fresh cheeses. However, as will be seen hereinafter, it is also possible by this process to produce other cheeses, for example processed cheeses. Produced by the process according to the invention, these processed cheeses are living products and must strictly be considered as new products by comparison with conventional processed cheeses which are dead products.

The process according to the invention is based on a concept entirely different from that which is the basis of the traditional cheese making industry in which there is a draining process, fermentation partly taking place during the draining process and in the open air. By contrast, according to the invention, drainage takes place at an early stage (more exactly it is the adjustment of the composition of the starting material which takes its place) and fermentation occurs in a closed chamber.

In the interests of convenience and clarity of the description, the preparation of the starting material the thermal pasteurisation or sterilisation treatment, the addition of the fermentation agent, packaging under heat and, finally, incubation will be dealt with successively in the following in the form of separate sections.

PREPARATION OF THE STARTING MATERIAL

The preparation of a starting material of which the composition is that of the finished cheese which it is desired to produce may be carried out in different ways. It is known that a cheese consists essentially of water, coagulatable proteins (in particular casein) and fats which in addition are accompanied by residues of non-coagulatable proteins (in particular lactalbumin), lactose and mineral salts which have not been eliminated during the drainage process.

The starting material may thus be obtained by mixing in suitable proportions materials containing all or some of the above-mentioned constituents and, if necessary, water. Materials such as these include caseins and caseinates, milk and whey powders, milk, concentrated milk, ultrafiltered milk, whey and fats of various origins, including butter.

The starting material may also be formed, to a large extent at least, by a retentate obtained by the ultrafiltration of a milk at a pH-value of from 5.9 to 6.2. Surprisingly, it was found that ultrafiltration at the ordinary pH-value of milk (approximately 6.6) gave a starting material which, subsequently treated as described above, led to cheeses having an unacceptable taste. As presented above and as the expression "ultrafiltration at a pH between 5.9 and 6.2" is meant to be understood, the preparation of the starting material is capable of being carried out in accordance with three main variants, which are as follows:

ultrafiltration of a milk previously acidified to a pH between 5.9 and 6.2, ultrafiltration of a milk previously acidified to a pH between 5.9 and 6.2 with at least partial dilution with an aqueous solution having a pH between 5.9 and 6.2, for example acidified water or whey acidified to the pH indicated above, ultrafiltration of an ordinary milk with at least partial dilution with an acid aqueous solution so as to reach a pH between 5.9 and 6.2.

The ultrafiltration technique of the first variant may be qualified "simple ultrafiltration" in contrast to the technique corresponding to the other two variants which is often known as "ultrafiltration with diafiltration". As used in the present context, the term "milk" is understood to mean a whole milk or, preferably, a skimmed milk.

Acidification of the milk which is essential to the first two variants may be carried out in different ways, either by chemical acidification, for example with hydrochloric acid or with lactic acid, or by biological acidification. It is also possible to carry out an indirect preliminary acidification by mixing the milk and an acid medium in suitable proportions. Acid whey or soft whey which has previously undergone chemical or biological acidification may be used for this purpose.

In addition of course to being formed by the retentate itself, the starting material may also be formed by mixing the retentate with other ingredients, milk, concentrated milk and other milk derivatives, as well as fats of various origins, including butter, aromatic substances, etc.

The starting material may also be elegantly obtained from milk by coagulation and drainage, followed by washing of the curd obtained in accordance with conventional cheese making technology. Providing the drained curd has the required composition and pH, it may be directly used as starting material. Otherwise its composition and/or its pH may be adjusted by the addition of suitable ingredients, as indicated above.

In addition, if the cheese which it is desired to produce so permits, the starting product may itself be completely or partly formed by a cheese, for example by a mass for processed cheese (cheese + processing salts).

THERMAL PASTEURISATION OR STERILISATION TREATMENT

This treatment may be carried out by any known method of pasteurisation or sterilisation, by indirect heating (heat exchangers) or direct heating (injection of steam), in particular by low or high temperature pasteurisation, for example 30 minutes at 62° to 63° C., 15 seconds at 72° C. or 2 to 5 minutes at 85° C., by UHT sterilisation or by HTST sterilisation, for example for 1 to 20 seconds at 140° to 150° C. Its object is to destroy as far as possible the microbial flora present in the starting material or at least all the germs which could interfere with the activity of the fermentation agent introduced during the hot packaging step.

It has generally been found that a thermal pasteurisation treatment which basically destroys all the vegetative living forms, except for the sporulated forms, is sufficient for the production according to the invention of fresh lactic paste cheeses, i.e. cheeses with a low pH (4.6 to 4.7). On the other hand, for other categories of fresh cheeses, it is often preferable to apply a more vigorous heat treatment, such as sterilisation, which normally destroys every vegetative living form, including the sporulated forms.

At the same time, it is important to ensure that the starting material is not destabilised by the heat treatment applied to it to the extent of losing its homogeneity. In particular, the vigour of this heat treatment should be selected to be compatible with the pH of the starting material given that the pH of the starting material may if necessary be corrected. For example, it is preferred to apply a thermal pasteurisation treatment when the starting material consists to a large extent at least of milk ultrafiltered at a pH of from 5.9 to 6.2.

PACKAGING UNDER HEAT AND ADDITION OF THE FERMENTATION AGENT

The pasteurised or sterilised product has to be packaged under heat so that no microorganism from the surrounding medium is able to implant itself permanently therein. In practice, these conditions are satisfied by packaging in hermetic containers under heat at a temperature above about 55° to 60° C. The fermentation agent is of course introduced as quickly as possible, preferably just before packaging.

This agent is selected in dependence upon the cheese which it is desired to obtain. It comprises at least those strains of the type normally used in cheese making or mutant strains which are better adapted to the closed media in which they are to act or even mixtures of strains in suitable proportions. Some interesting strains, given by way of example, are *Streptococcus lactis, cremoris, thermophilus, diacetyllactis, Lactobacillus bulgaricus, lactis, helveticus, casei, Leuconostoc citrovorum*, etc. In combination with these strains, it is also possible to add a food-grade acid, such as hydrochloric acid, or an enzymatic system, such as rennet, during packaging under heat.

The actual packaging operation does not require any particular comments and the hermetic containers used may be either tin cans or glass pots or plastic or aluminium cups. An impermeable coating acting so to speak as a "crust" may also be used for packaging.

INCUBATION

The incubation step is an operation which consists in keeping the packaged product at a suitable temperature until fermentation is complete, i.e. until the product is stabilised and has acquired its definitive characters. This fermentation is generally achieved after a period of from 6 to 48 hours, depending upon the products, the microorganisms and the temperatures applied. At the end of this time, the cheese is in equilibrium and there is no longer any significant development, even at the incubation temperatures.

Incubation may be carried out rapidly after packaging or after a suitable time interval, although it must take place at one moment or another otherwise the product will not be the cheese required.

As is well known in conventional cheese making, the fermentation temperatures are in the range from 18° to 55° C. and advantageously in the range from 20° to 45° C., i.e. at a temperature at which the cheese strains are capable of doing their work. It is of course this temperature range which will be used for incubation. The choice of a particular incubation temperature depends upon the type of cheese being produced and upon the type of fermentation agent used. For example, a "lactic paste" will preferably be incubated at a temperature of from 18° to 30° C.

In a first preferred embodiment of the process according to the invention, a starting material having the following composition, expressed in parts by weight:

| | |
|---|---|
| water | 62 to 68 parts |
| proteins, of which casein | 7.5 to 8 parts |
| makes up | 80 to 90% by weight |
| lactose | 3.8 to 4.2 parts |
| fats | 20 to 22 parts |
| miscellaneous | 1 to 3 parts | by mixing, in suitable proportions, water, milk or powdered whole or skimmed milk, whey or powdered whey, casein, caseinates, fats, etc.

In a second preferred embodiment, a starting material is prepared on the basis of milk ultrafiltered at a pH between 5.9 and 6.2 or on the basis of a mixture of an ultrafiltered milk thus obtained and a thermally concentrated milk, the starting material having the following composition:

|  |  |
| --- | --- |
| water | 50 to 90 parts |
| proteins, of which casein makes up | 7 to 25 parts 65 to 70% by weight |
| lactose | 4 to 4.5 parts |
| fats | 0 to 20 parts |
| miscellaneous | 0 to 4 parts, |

In a third preferred embodiment, a starting material having the same composition as the starting materials mentioned above is prepared by coagulating the milk and then draining the curd obtained. If necessary, fats, milk powder and salt may be added to the curd obtained in order to complete the formula.

In a fourth preferred embodiment, a processed cheese or a mixture of processed cheeses is directly used as the starting material.

If desired, the pH of the starting material is adjusted to above 5.8–5.9, followed by pasteurisation to an extent sufficient to obtain lactic-paste cheeses, or by sterilisation in the case of a less acid cheese. The product obtained is optionally homogenised and then poured hot (55° to 60° C.) into suitable containers or into containers surrounded by an impermeable envelope. Before the containers have been hermetically sealed, cheese-grade strains selected in dependence upon the cheeses which it is desired to obtain and, optionally, rennet are introduced into them. The packaged product is then incubated as required at a temperature of from 18° to 30° C. (lactic pastes) or at a temperature of from 25° to 40° C. (other cheeses) until the fermentative potential has been exhausted.

Other ingredients may of course be added, preferably after heat treatment at the aseptic packaging stage, for example colorants and edible flavours, pieces of fruit or sugar.

The cheeses obtained may be stored without difficulty for several weeks and, in a refrigerator, for at least three months providing they are kept in their non-open container. They may be fresh cheeses similar to traditional short-lived fresh cheeses. They may also be living processed cheeses which, in contrast to ordinary processed cheeses, have undergone fermentation and which, as a result, have a much better texture and taste.

The process according to the invention is illustrated by the following Examples. In these Examples, the parts and percentages quoted represent parts and percentages by weight.

EXAMPLE 1

A curd of lactic character or lactic paste is prepared by coagulating a standard skimmed milk containing 9% of dry matter with mesophyllic strains *Streptococcus lactis* and *cremoris* and traces of rennet (1 to 2 cc/100 l). Coagulation is carried out to obtain a pH of the order of 4.6 after 18 to 20 hours at 18° to 20° C. The curd obtained is then drained in nozzle-equipped centrifuges, subsequently mixed with cold water in a ratio of 1 to 5 and then drained a second time. A material of the following composition is thus obtained:

|  |  |
| --- | --- |
| total dry matter | 16% |
| of which proteins make up | 13% |
| and lactose | 1% |

40% lactic cream (29.1 parts for 65 parts), skimmed milk powder (5.2 parts) and salt (0.3 part) are then added to this material, after which the whole is homogenised at 20° C. under a pressure of 20 atmospheres. This gives a starting material having the following composition:

|  |  |
| --- | --- |
| total dry matter | 29% |
| of which proteins make up | 10% |
| lactose | 3.3% |
| and fats | 11.6% |

This starting material then has sodium hydroxide added to it up to pH 6, after which it is pasteurised for 2 minutes at 85° C., homogenised at the same temperature under a pressure of 50 atms and finally cooled to 56° C. By means of a metering pump, lactic ferments *Streptococcus lactis* and *cremoris* are then introduced into the mass in a quantity of 4% just before packaging under heat. The mass is packaged in plastic cups with heat-sealed lids.

The following procedure is then adopted:

(1) a first third of the cups is kept for 12 hours at 23° C. and then for 3 days at 20° C., (2) a second third is kept for 6 hours at 23° C. and then for 1 month at 15° C., (3) the final third is kept for 1 month at 5° C., for 12 hours at 23° C. and then for 3 days at 20° C., after which the cups are opened.

They are found to contain fresh cheese containing 40% of fats/dry matter and all having the texture and taste characteristics of an ordinary fresh cheese. In addition, an unadvised taster is incapable of distinguishing between the fresh cheeses obtained by the incubation variants (1), (2) or (3) described above.

EXAMPLE 2

The procedure is as in Example 1, except that 5 ppm of rennet are also added at the hot packaging stage. Incubation is carried out in accordance with the second variant.

The cups are found to contain a fresh cheese which is distinguished from the fresh cheese of Example 1 by a more flaky texture.

EXAMPLE 3

A processed cheese is prepared from a fresh Cheddar curd by heating to 80° C. and adding 3% of processing salts (sodium phosphate and citrate). This processed cheese has the following composition:

|  |  |
| --- | --- |
| total dry matter | 35% |
| of which proteins make up | 20% |
| lactose | 0.2% |
| fats | 7% | pH = 6.25

This processed cheese is sterilised for 20 s at 145° C., cooled to 58° C. and then inoculated with 4% of *Strepto-*

*coccus thermophilus* and *Lactobacillus bulgaricus.* The cheese is then packaged under heat in boat-shaped plastic containers which are then hermetically sealed.

The following procedure is then adopted:

(1) a first third of the boats is kept for 12 hours at 35° C. and then for 1 day at 20° C., (2) a second third of the boats is kept for 12 hours at 35° C. and then for 2 months at 15° C., (3) the final third of the boats is kept for 1 month at 5° C., for 18 hours at 35° C. and finally for 3 days at 20° C., after which the boats are opened.

They are found to contain cheeses resembling processed cheeses. However, on tasting, these cheeses reveal a surprising "freshness" and a delicate texture which radically distinguishes them from conventional processed cheeses.

EXAMPLE 4

Sodium caseinate powder (6 parts), 40% lactic cream (53 parts), skimmed milk powder (2 parts) and salt (0.3 part) are added to fresh skimmed milk (34 parts) so as to obtain a starting material having the following composition:

| | |
|---|---|
| dry matter | 35% |
| of which proteins make up | 8% |
| lactose | 4% |
| fats | 21% | pH = 6.2.

This starting material is then treated in the same way as described in Example 1, (pasteurisation, inoculation and packaging under heat in plastic cups). The three incubation variants are used. On each occasion, the cups are found after opening to contain a fresh cheese containing 60% of fats/dry matter which has all the characters of a traditional lactic paste.

EXAMPLE 5

A skimmed milk is pasteurised for 15 s at 80° C. and is then cooled to 10° C. The pasteurised milk is then acidified to pH 5.9 with lactic acid diluted to 10% in water. After 2 to 3 hours, the pH stabilises around 6.0. This acidified milk is ultrafiltered in a DDS module, type GR6, comprising a total of 9 square meters of DDS membrane, second generation, to obtain a retentate having a dry matter content of defatted dry extract "DDE" of 12.8%. This retentate is standardised by the addition of cream containing 40% of fats and then by homogenisation at 40° C./300 atms. The material obtained is then pasteurised for 20 minutes at 65° C. and then cooled to 55° C. At this temperature, it is incubated with 10% of lactic ferments Probatat de Standa, Caen, France (mixture of *Streptococcus lactis, cremoris* and *diacetyllactis*), after which the whole is immediately poured, still at a temperature of 55° C., into glass or plastic pots which are immediately hermetically sealed. These pots are then kept for 10 hours at 30° C. and then stored for 2 months at 8° C.

The pots are found on opening to contain a fresh cheese containing 40% of fats/dry matter and having a pH of 4.4. This cheese has a "smooth", unctuous and firm texture and does not sag when removed from the pots. It has an agreeably acidulated and aromatic taste.

By way of variation, cheeses containing 30% and 50% of fats are prepared by proportionally adding less and more 40% cream. Except for the fats, these cheeses have the same characters as the 40% cheese mentioned above.

COMPARISON EXAMPLE

The procedure of Example 5 is repeated using an ordinary, i.e. non-acidified skimmed milk having a pH of 6.6.

Although it has the appearance and texture of a fresh cheese, the product obtained has an unpleasant sharp and piquant taste.

EXAMPLE 6

The procedure is as in Example 5, except that no fats are added. A fresh cheese is obtained which, although lean and hence low in calories, nevertheless has an agreeable appearance and texture coupled with an aromatic, slightly acidulated taste.

EXAMPLE 7

The procedure is as in Example 5, except that 0.2% by weight of rennet having a strength of 1/10,000 is added in addition to the lactic ferments. The cheese obtained is found to have a firmer and more fragile texture than the cheese of Example 5.

EXAMPLE 8

The procedure is as in Example 5, except that the starting milk is acidified to pH 6.0 not with dilute lactic acid, but instead with acid (pH 3.3) cheese-making whey which emanates from a preceding ultrafiltration operation and which has been biologically acidified. The correct pH of 6 is obtained by adding 9 parts by weight of acid whey to 100 parts by weight of milk. After thorough mixing, the acidified milk obtained is ultrafiltered and then generally treated in the same way as described in Example 5.

The cheese obtained is comparable with that of Example 5, although its analysis reveals that it is slightly richer in proteins (approximately 2%).

EXAMPLE 9

A skimmed milk is pasteurised for 15 s at 80° C. and then cooled to 10° C. The pasteurised milk is then acidified to pH 5.9 with lactic acid diluted to 10% in water. After 2 to 3 hours, the pH stabilises around 6.0. This acidified milk is then ultrafiltered in a DDS module, type GR6, comprising a total of 9 square meters of DDS membrane, second generation, to obtain a retentate having a dry matter content (DDE) of 14%. The ultrafiltration treatment is then continued by diluting the retentate with water acidified to pH 6.0 at a rate equivalent to the rate of elimination of the permeate. Ultrafiltration is stopped when the retentate contains 0.5% by weight of lactose, based on the total retentate, which corresponds to a DDE of approximately 9.5%. This retentate is then standardised by the addition of 11% of cream containing 40% of fats and 0.7% of lactose by the addition of lactose powder.

The further procedure is then as described in Example 5.

The cheese obtained has a smooth, bright, firm and unctuous texture and is considerably less aromatic than the cheese of Example 5.

The addition of flavours or seasonings just before packaging under heat gives a fresh cheese which is seasoned to the same extent as commercial seasoned fresh cheeses.

EXAMPLE 10

The procedure is as in Example 9, except that no cream is added.

A lean, neutral cheese is thus obtained and may of course be seasoned.

EXAMPLE 11

The procedure is as described in Example 9, i.e. ultrafiltration with dilution using water acidified to pH 6.0 when the retentate has reached a DDE of 14%, but starting from a milk acidified with biologically acidified whey (pH 3.3), as indicated in Example 4.

The cheese obtained is entirely comparable with that of Example 9, although slightly richer in proteins.

EXAMPLE 12

A 50/50 mixture of skimmed milk ultrafiltered to a DDE of 15% at a pH=6.0 (as described at the beginning of Example 5 or 9) and whole milk thermally concentrated to a non-fat dry matter (DDE) content of 15% is prepared.

The cheese is then produced in the same way as described in Example 5.

EXAMPLE 13

The procedure is as described in Example 12 using a 75/25 mixture, i.e. 75 parts of skimmed milk ultrafiltered to a DDE of 15% at a pH-value of 6.0 and 25 parts of whole milk thermally concentrated to a DDE of 15%.

The cheese obtained has a much more neutral taste than that obtained in accordance with Example 12.

We claim:

1. A process for the production of cheese which comprises providing a starting material the composition of which is that of the cheese which it is desired to produce, subjecting this material to a thermal pasteurisation or sterilisation treatment, packaging the pasteurised or sterilised material under heat at a temperature equal to 55° C. or above in a hermetic container or containers whilst at the same time adding a lactic fermentation agent to it and, finally, incubating the product thus packaged until fermentation is complete, wherein no drainage takes place once the starting material is provided.

2. A process as claimed in claim 1, wherein the starting material is a mixture consisting of ingredients selected from caseins, caseinates, milk and whey powders, milk, concentrated milk, ultrafiltered milk, whey and fats.

3. A process as claimed in claim 1, wherein the starting material is subjected to a thermal pasteurisation treatment the starting material consists to a large extent at least of a retentate obtained by ultrafiltration of a milk at a pH of from 5.9 to 6.2.

4. A process as claimed in claim 3, wherein the starting material consists to a large extent at least of a retentate obtained by ultrafiltration of a milk previously acidified to a pH of from 5.9 to 6.2.

5. A process as claimed in claim 4, wherein the starting material consists to a large extent at least of a retentate obtained by ultrafiltration of the previously acidified milk with at least partial dilution during ultrafiltration with an aqueous solution having a pH-value of from 5.9 to 6.2.

6. A process as claimed in claim 5, wherein the aqueous solution is water acidified to a pH value of from 5.9 to 6.2.

7. A process as claimed in claim 5, wherein the aqueous solution is whey acidified to a pH-value of from 5.9 to 6.2.

8. A process as claimed in claim 3, wherein the starting material consists at least partly of a retentate obtained by ultrafiltration of an ordinary milk so as to reach a pH-value of from 5.9 to 6.2.

9. A process as claimed in claim 3, wherein the milk is a skimmed milk.

10. A process as claimed in claim 4, wherein the milk is previously acidified by chemical means.

11. A process as claimed in claim 4, wherein the milk is previously acidified by biological means.

12. A process as claimed in claim 4, wherein the milk is previously acidified by the addition of chemically or biologically acidified whey.

13. A process as claimed in claim 3, wherein the starting material is a mixture of a retentate obtained by ultrafiltration of a milk at a pH-value of from 5.9 to 6.2 and of a thermally concentrated milk.

14. A process as claimed in claim 1, wherein the starting material consists at least partly of a curd.

15. A process as claimed in claim 14, wherein the curd is a curd of lactic character.

16. A process as claimed in claim 1, wherein the starting material consists at least partly of a processed cheese.

17. A process as claimed in claim 1, wherein the fermentation agent consists of one or more cheese-grade strains of micro-organisms.

18. A process as claimed in claim 17, wherein the fermentation agent consists of Streptococcus, Lactobacillus and Leuconostoc strains.

19. A process as claimed in claim 17, wherein the fermentation agent contains rennet.

20. A process as claimed in claim 1, wherein the packaged product is incubated at a temperature in the range from 18° to 55° C.

21. A process as claimed in claim 20, wherein the packaged product is incubated at a temperature of from 20° to 45° C.

22. A process as claimed in claim 1, wherein the packaged product is incubated for between 6 and 48 hours.

23. A cheese when produced by a process as claimed in claim 1.

24. A processed cheese produced by the process of claim 1.

* * * * *

UNITED STATES PATENT AND TRADEMARK OFFICE
CERTIFICATE OF CORRECTION

PATENT NO. : 4,194,011
DATED : March 18, 1980
INVENTOR(S) : Rutilio Invernizzi and Giovanni Prella It is certified that error appears in the above—identified patent and that said Letters Patent is hereby corrected as shown below:

Col. 1, line 19, "mild" should read -- milk --.

Signed and Sealed this

Twelfth Day of August 1980

[SEAL]

Attest:

SIDNEY A. DIAMOND

Attesting Officer

Commissioner of Patents and Trademarks